(12) United States Patent
Singh et al.

(10) Patent No.: US 8,229,430 B1
(45) Date of Patent: Jul. 24, 2012

(54) POWER ADJUSTMENT BASED UPON DISTRIBUTION OF DEVICES

(75) Inventors: Jasinder Pal Singh, Olathe, KS (US); Jason Peter Sigg, Overland Park, KS (US); Anthony Kit-yui Leung, Kansas City, MO (US); Maulik K. Shah, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 30 days.

(21) Appl. No.: 12/968,351

(22) Filed: Dec. 15, 2010

(51) Int. Cl.
*H04W 4/00* (2009.01)

(52) U.S. Cl. .................. 455/435.1; 455/435.2; 455/450; 455/452.1; 455/522

(58) Field of Classification Search .... 455/435.1–435.3, 455/450–451, 452.1–452.2, 522
See application file for complete search history.

(56) References Cited

U.S. PATENT DOCUMENTS

| | | | |
|---|---|---|---|
| 6,385,183 B1 * | 5/2002 | Takeo | 370/335 |
| 2004/0242257 A1 * | 12/2004 | Valkealahti et al. | 455/522 |
| 2006/0129638 A1 | 6/2006 | Deakin | |
| 2011/0275404 A1 * | 11/2011 | Ding et al. | 455/522 |

* cited by examiner

*Primary Examiner* — Wayne Cai (57) ABSTRACT

Embodiments disclosed herein provide methods and systems for adjusting the signal strength of a pilot signal based on the distribution of wireless communication devices. In an embodiment, a method of operating a wireless communication system to control a pilot signal is disclosed. The method comprises receiving registration information transmitted from a plurality of wireless communication devices, processing the registration information to determine device type information for the wireless communication devices, processing the device type information to determine a power level to transmit the pilot signal, transferring an instruction indicating the power level for the pilot signal for delivery to a base station, and transmitting the pilot signal from the base station at the indicated power level.

16 Claims, 7 Drawing Sheets

POWER ADJUSTMENT BASED UPON DISTRIBUTION OF DEVICES

TECHNICAL BACKGROUND

Wireless communications have become increasingly prominent for sending and receiving information. For example, individuals may utilize a wireless communication device for voice communications, research, entertainment, or for conducting critical business transactions. To support these services, a wireless communication network may perform communications via forward-link communication channels and reverse-link communication channels. Forward-link communication channels typically carry communications from a wireless access network to wireless communication devices, while the reverse-link communication channels transfer communications from the wireless communication devices to the network. The forward-link channels may include pilot channels, sync channels, forward traffic channels, and paging channels.

Typically, a pilot channel comprises a fixed power signal commonly known as a "pilot" or "control channel" signal. Wireless communication devices within range use the pilot signal to register with a base station (or tower). However, to increase range or effective coverage of the base station, wireless communication providers often increase the fixed power level or strength at which the pilot signal is transmitted. Unfortunately, increasing the fixed power level at which the pilot signal is transmitted often results in unnecessary communications.

OVERVIEW

A wireless communication system to control a pilot signal is disclosed. The wireless communication system comprises a control system and a base station. The control system is configured to receive registration information transmitted from a plurality of wireless communication devices, process the registration information to determine device type information for the wireless communication devices, process the device type information to determine a power level to transmit the pilot signal, and transfer an instruction indicating the power level for the pilot signal for delivery to a base station. The base station is configured to receive the instruction indicating the power level for the pilot signal and to transmit the pilot signal at the indicated power level.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In wireless communication systems it is difficult for wireless communication providers to determine the appropriate signal strength for pilots. For example, it is often desirable for wireless communication providers to increase their effective network coverage. However, it is also important to limit unnecessary communication in congested base station cells and sectors in order to improve the call quality of communication channels and to reduce undesirable cross-channel interference. Increasing the signal strength at which a pilot signal is transmitted increases effective network coverage but may also result in unnecessary communications. For instance, wireless communication devices may receive (or hear) a pilot but may be unable to register with the base station because they are reverse link limited to transmit at a max of 23 decibels (dB). In this case, the wireless communication devices unsuccessfully transmit unnecessary registration information to the base station.

In recent years, wireless communication devices have advanced significantly making it even more difficult for wireless communication providers to determine the appropriate signal strength for pilots. For example, advanced wireless communication devices may now include antennas capable of decoding signals at less power than their legacy counterparts. These advanced wireless communication devices may hear the pilot even further from the base station than legacy wireless communication devices. Moreover, regardless of range, advanced wireless communication devices are more desirable in congested base station cells and sectors because they require less power.

Advantageously, a method and system for dynamically controlling the signal strength of a pilot based on the distribution of devices is described herein to assist wireless providers in achieving the appropriate balance between signal quality and network coverage.

Figure 1:
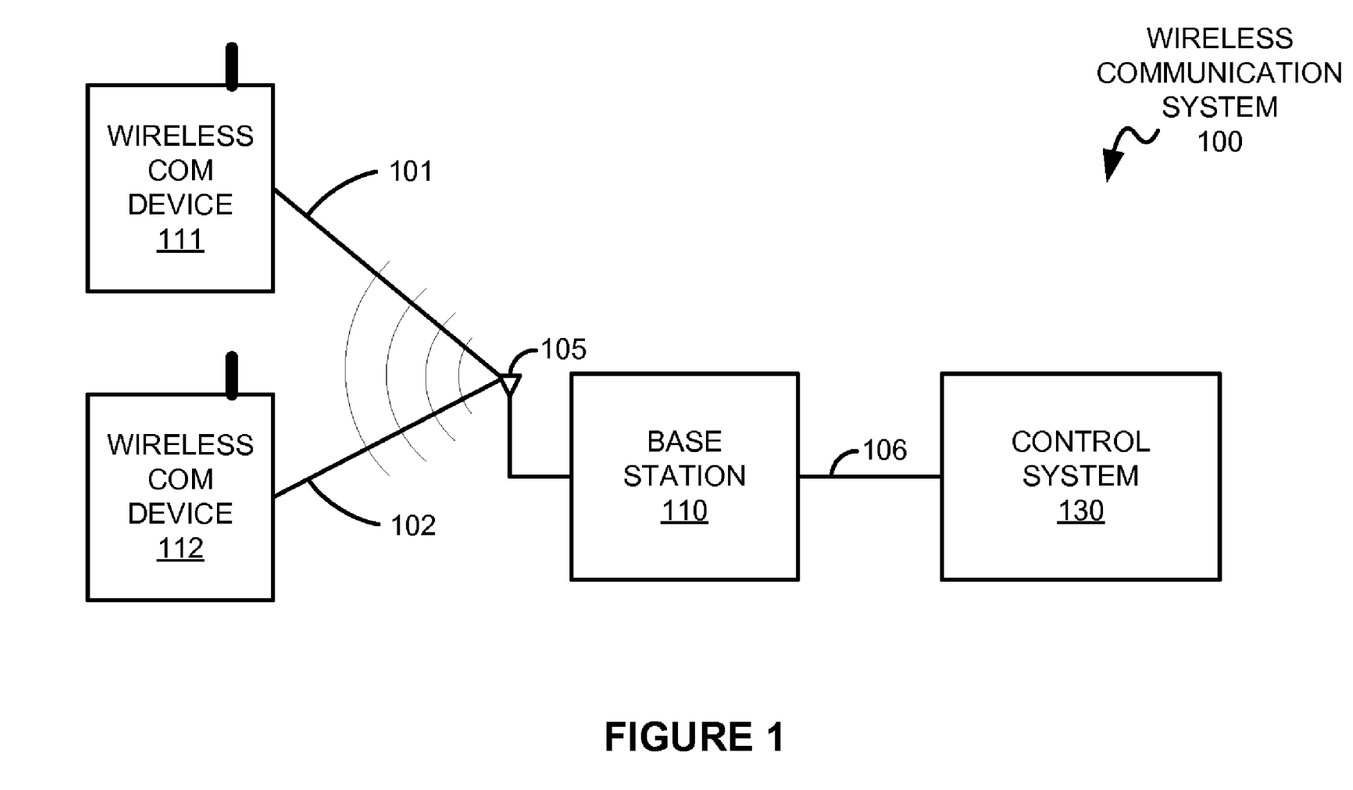
FIG. 1 illustrates a wireless communication system.

FIG. 1 illustrates wireless communication system 100 according to an embodiment. Wireless communication system 100 includes wireless communication devices 111 and 112, base station 110, and control system 120. Base station 110 includes transceiver 105 to communicate with wireless communication devices 111 and 112. Base station 110 and wireless communication devices 111 and 112 are in communication over wireless links 101 and 102, respectively. Base station 110 and control system 120 are in communication over communication link 106. In this example, two wireless communication devices are shown for simplicity. Those skilled in the art will appreciate that more or fewer wireless communication devices may be included in wireless communication system 100.

In operation, base station 110 transmits a "pilot" or "control channel" signal that is received by wireless communication devices within range. For example, base station 110 may transmit a pilot signal over wireless links 101 and 102. The pilot signal strength may initially be set to a value specified by the cellular provider to maximize the effective network coverage of base station 110. Upon reception of the pilot signal, wireless communication devices 111 and 112 provide the base station with registration information.

Registration information may be used to indicate the distribution of the wireless communication devices. For example, base station 110 communicates the registration information to control system 120 over communication link 106. The registration information may include an electronic serial number (ESN) and/or a mobile identification number (MIN) for each of the wireless communication devices. The registration information can then be processed to identify the device types. For example, control system 120 may process the ESN/MIN to identify whether wireless communication devices 111 and 112 are advanced or non-advanced devices. Control system 120 then adjusts the power or strength at which the pilot signal is transmitted based on the wireless communication device types and directs base station 110 to transmit the pilot signal at the adjusted power level.

Figure 2:
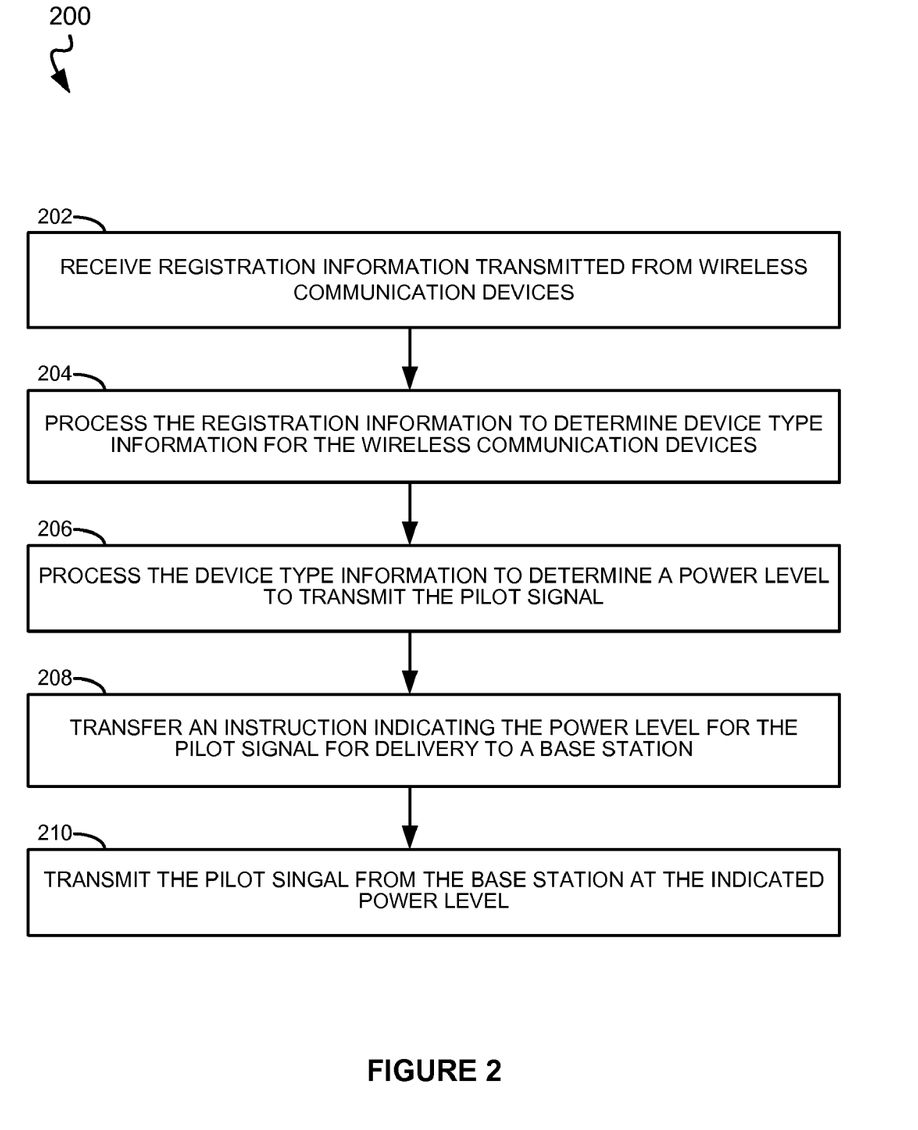
FIG. 2 illustrates operation of a wireless communication system.

FIG. 2 illustrates operation of wireless communication system 100 according to an embodiment. In this example, communication system 100 controls the signal strength of the pilot signal based on distribution of the wireless communication devices. To begin, registration information is received from wireless communication devices (202). For example, control system 120 receives registration information transmitted from wireless communication devices 111 and 112. The registration information is often sent in response to a pilot signal. That is, base station 110 may transmit a pilot signal that is received by wireless communication devices within range. In this example, base station 110 transmits a pilot signal over wireless links 101 and 102. The pilot signal strength may initially be set to a value specified by the cellular provider to maximize effective network coverage. For example, the pilot signal strength may initially be set to a value at or beyond the maximum power level at which a wireless communication device can respond. Those skilled in the art will appreciate that wireless communication devices are typically reverse link limited to transmit at a max of 23 decibels (dB).

Upon reception of the pilot signal, wireless communication devices 111 and 112 provide base station 110 with registration information. The registration information is received by base station 110 and communicated to control system 120 over communication link 106. As discussed, the registration information may include an ESN, a MIN, and/or any other information used to identify the wireless communication devices.

Once received, the registration information is processed to determine device type information for the wireless communication devices (204). In one example, the ESN and/or the MIN are used to identify the device type information. The device type information may include, for example, a model number, antenna type, or any other device information that could be used to indicate device sensitivity or fidelity. Those skilled in the art will appreciate that the device type information may be stored within control system 120. Alternatively or additionally, an external system or database (not shown) may be accessed to obtain the device type information for some or all of the wireless communication devices.

The device type information is then processed to determine a signal strength or power level at which to transmit the pilot signal (206). For example, if the device type information indicates a number of advanced devices or a number of non-advanced (e.g., legacy devices), then control system 120 can adjust the signal strength of the pilot signal accordingly. In one example, wireless communication devices 111 and 112 are both advanced devices with diversity antennas, and thus control system 120 determines that a lower signal strength for the pilot signal is appropriate. In another example, control system 120 keeps the signal strength of the pilot signal unchanged. In yet other examples, after decreasing the signal strength of the pilot signal, control system 120 may then increase or reset the signal strength to a default power level. This may occur if, for example, registration information is not received from a minimum number of devices.

Advantageously, control system 120 dynamically adjusts the signal strength at which the pilot signal is transmitted based on the registration information. Once the appropriate signal strength is determined, an instruction is transferred to the base station indicating the appropriate signal strength the pilot signal (208). For example, upon determining the signal strength for the pilot signal, control system 120 generates and transmits an instruction to base station 110. In this example, the instruction indicates the adjusted power level for transmitting the pilot signal.

Lastly, the base station transmits the pilot signal at the indicated power level (210). For example, base station 110 may transmit the pilot signal at the indicated power level over wireless links 101 and 102 for delivery to wireless communication devices within range. Those skilled in art will appreciate that additional wireless communication devices (not shown) may be within range if the signal strength of the pilot is increased. Likewise, wireless communication devices 111 and/or 112 may be out of range if the signal strength of the pilot is decreased.

Referring back to FIG. 1, wireless communication devices 111 and 112 could comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication devices 111 and 112 may also include a user interface, memory device, software, processing circuitry, or some other communication components. For example, wireless communication devices 111 and 112 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof.

Base station 110 comprises RF communication circuitry and an antenna. The RF communication circuitry typically includes an amplifier, filter, RF modulator, and signal processing circuitry. Base station 110 may also comprise a router, server, memory device, software, processing circuitry, cabling, power supply, network communication interface, structural support, or some other communication apparatus.

Control system 120 comprises a processing system and communication interface. Control system 120 may also include other components such as a router, server, data storage system, and power supply. Control system 120 may reside in a single device or may be distributed across multiple devices. Control system 120 may be a discrete system or may be integrated within other systems—including other systems within wireless communication system 100. Control system 120 could comprise a packet gateway, mobile switching center, network gateway system, Internet access node, application server, service node, firewall, or some other communication system—including combinations thereof.

Wireless links 101 and 102 use the air or space as the transport media. Wireless links 101 and 102 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

Communication link 106 uses metal, glass, air, space, or some other material as the transport media. Communication link 106 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 106 could be a direct link or may include intermediate networks, systems, or devices.

Figure 3:
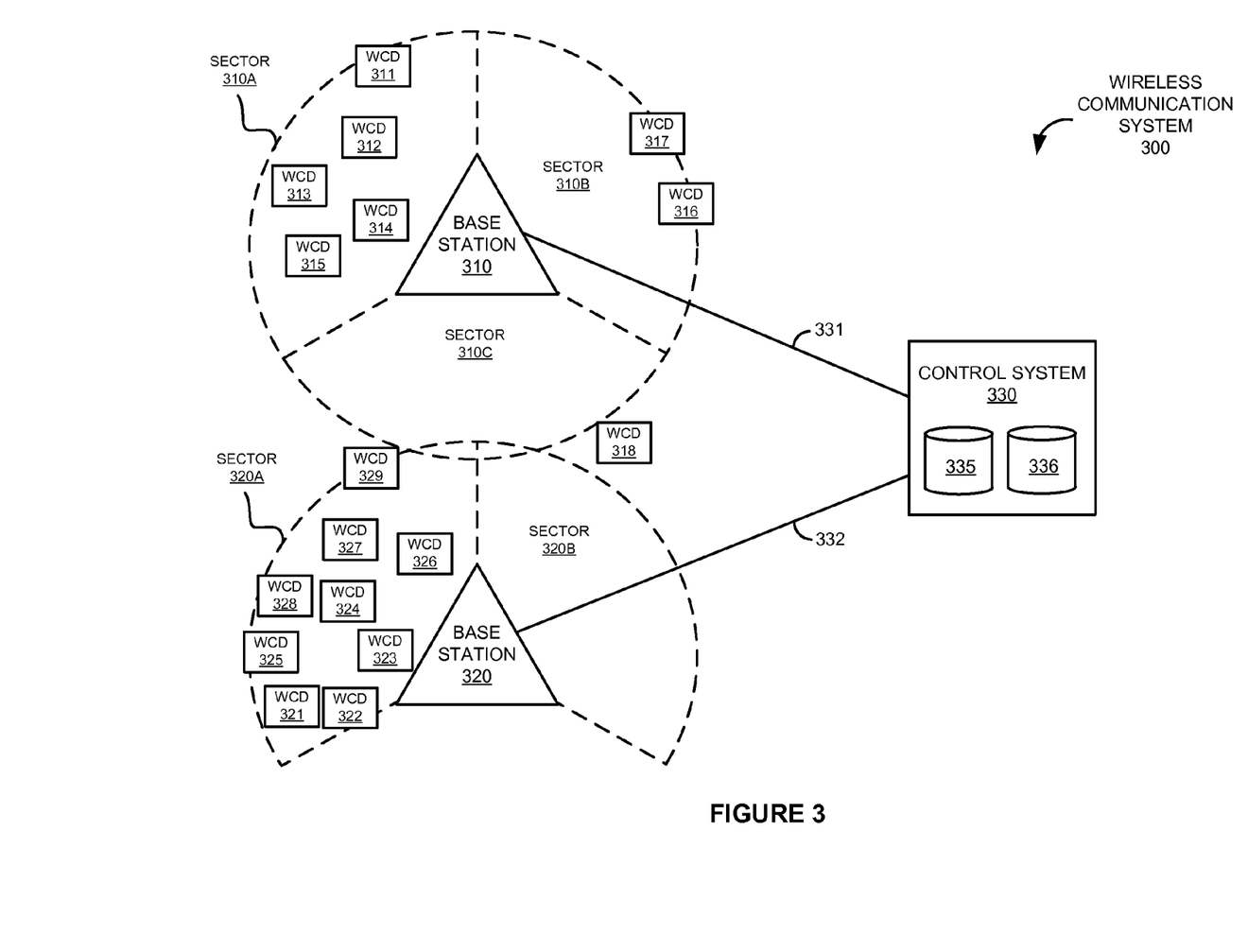
FIG. 3 illustrates a wireless communication system.

FIG. 3 illustrates wireless communication system 300 according to an embodiment. Wireless communication system 300 includes wireless communication devices 311-318 and 321-329, base stations 310 and 320, and control system 330. In this example, base station 310 and wireless communication devices 311-118 are in communication over wireless links. Likewise, base station 320 and wireless communication devices 321-329 are in communication over wireless links. Base stations 310 and 320 are in communication with control system 330 over communication links 331 and 332, respectively. Those skilled in the art will appreciate that more or fewer wireless communication devices may be present within wireless communication system 300.

In this example, base station 310 is shown having three sectors: sector 310A, sector 310B, and sector 310C. Base station 310 includes three directional transceivers (not shown for simplicity) that communicate with wireless communication devices within each sector, respectively. Each directional transceiver transmits a pilot signal at a power level or signal strength independent of the other direction transceivers. In this example, sector 310A includes wireless communication devices 311-315; sector 310B includes wireless communication devices 317-318; and sector 310C includes wireless communication device 318.

Base station 320 is shown having two sectors: sector 320A, and sector 320B. As shown, base station 320 includes two direction transceivers (not shown) that communicate with wireless communication devices with each sector, respectively. Those skilled in the art will appreciate that base station 320 may include more or fewer directional transceivers corresponding to more or fewer sectors. In this example, sector 320A includes wireless communication devices 321-329. Sector 320B does not include any wireless communication devices. Those skilled in the art will appreciate that in some embodiments, a sector may have more than one directional transceiver. In this case, the directional transceivers may be controlled either individually or per sector (e.g., as a group).

Control system 330 includes registration information database 335 and receive sensitivity database 336. Registration information database 335 may include registration information for wireless communication devices and associated details for each communication device. For example, the received registration information from the wireless communication devices can be matched against the registration information contained within registration information database 335 to determine information about the individual wireless communication devices. The registration information may be used to determine a variety of information about a wireless communication device including but not limited to: a device type, a model number, manufacturer, and antenna type. An example of registration information database 335 is discussed in more detail with respect to FIG. 5.

Receive sensitivity database 336 may include registration information for wireless communication devices and an associated receive sensitivity. The receive sensitivity may be preset based on the type of device. Alternatively or additionally, the receive sensitivity may be calculated by control system 330, for example, each time that a wireless communication device provides registration information. An example of receive sensitivity database 336 is discussed in more detail with respect to FIG. 6. In one example, the receive sensitivity database quantifies the sensitivity or fidelity of the wireless communication device's that have registered with the base stations in communication with the control system.

Although shown separately, registration information database 335 and receive sensitivity database 336 may reside in a single database. Alternatively or additionally, some or all of the information contained within registration information database 335 and receive sensitivity database 336 may be distributed across multiple systems and/or networks.

Figure 4:
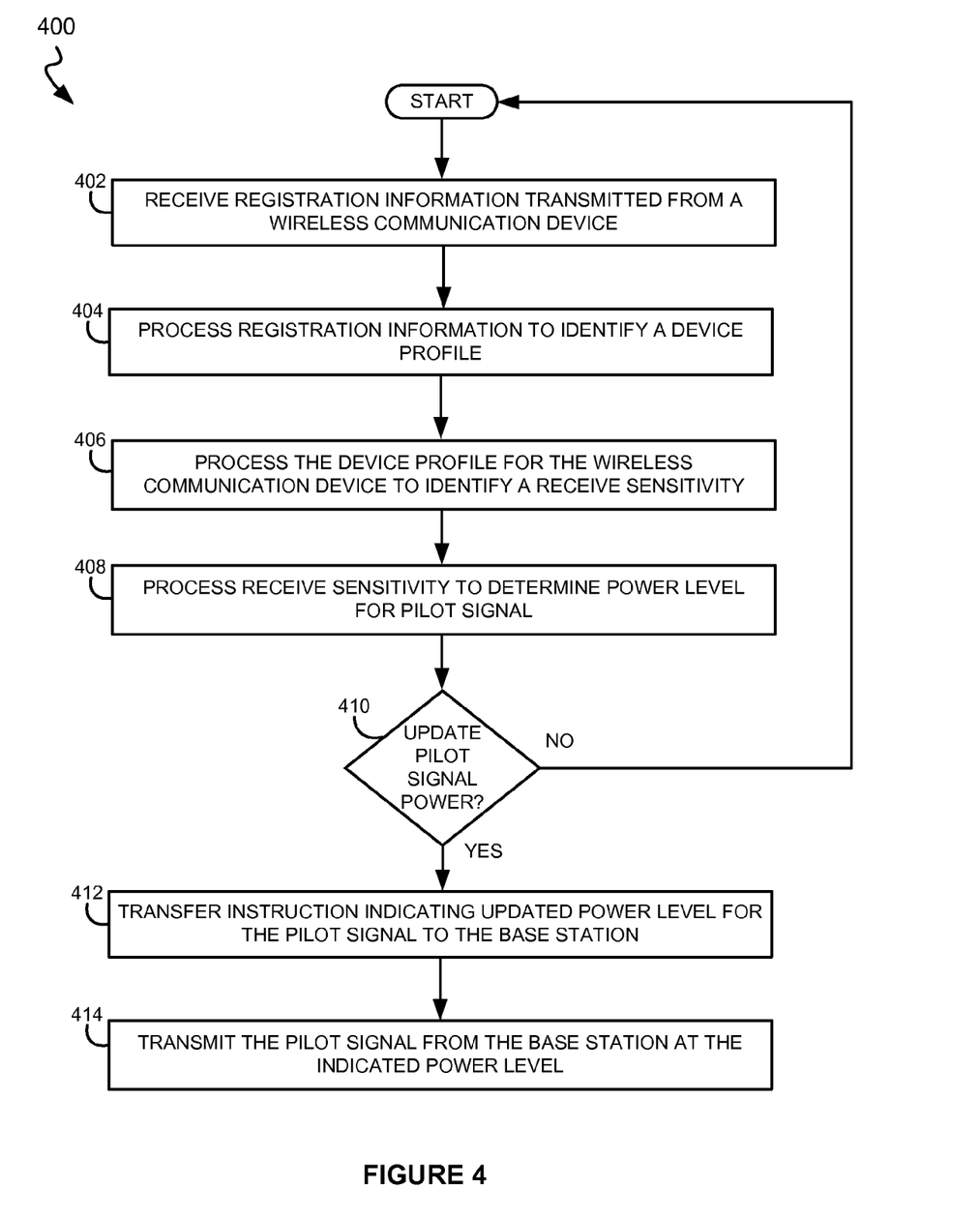
FIG. 4 illustrates operation of a wireless communication system.

FIG. 4 illustrates operation of a wireless communication system 300 according to an embodiment. In this example, communication system 300 controls the signal strength or power level of pilot signals transmitted from base stations 310 and 320.

To begin, registration information is received from wireless communication devices (402). The registration information is often sent in response to wireless communication devices reading various pilot signals, determining which of the pilot signals is strongest, and registering with the base station corresponding to the strongest pilot. For example, base stations 310 and 320 transmit "pilot" or "control channel" signals to each sector. The pilot signals are received by wireless communication devices in each of the respective sectors. In this example, base station 310 transmits a pilot signal covering wireless communication devices in sector 310A, a pilot signal covering wireless communication devices in sector 310B, and a pilot signal covering wireless communication devices in sector 310C. Likewise, base station 320 transmits a pilot signal covering wireless communication devices in sector 320A and a pilot signal covering wireless communication devices sector 320B. Each pilot signal may be transmitted from one or more directional transceivers. Moreover, those skilled in the art will appreciate that each pilot signal may be transmitted at a different signal strength or power. In this example, the signal strength or power level of the pilot signals may be set at or beyond the maximum signal strength at which a wireless communication device can respond.

Upon reception of the pilot signals, wireless communication devices provide the base stations with registration information. For example, wireless communication devices 311-315 located in sector 310A receive the pilot signal covering sector 310A and provide registration information to base station 310; wireless communication devices 316-317 located in sector 310B receive the pilot signal covering sector 310B and provide registration information to base station 310; and wireless communication device 318 located in sector 310B receives the pilot signal covering sector 310C and provides registration information to base station 310. Similarly, wireless communication devices 321-329 located in sector 320A receive the pilot signal covering sector 320A and provide registration information to base station 320.

Those skilled in the art will appreciate that wireless communication devices may provide registration information at various times, and thus base stations may receive the registration information at various times. For example, a wireless communication device may provide registration information when a device powers up, when a device is handed off from one base station to another, when the device attempts to make a call, and/or when the received signal strength drops below some threshold. Other scenarios and situations for providing registration information are also possible.

The registration information is received by base stations 310 and 320 and communicated to control system 330 over communication links 331 and 332, respectively. As discussed, the registration information may include an ESN, a MIN, and/or any other information used to identify the type of wireless communication devices within range.

Once received, registration information is processed to determine a device profile for the wireless communication device (404). For example, control system 330 can process the ESN and/or the MIN to identify a device profile. The device profile may include or indicate a model number, a manufacturer, an antenna type, and/or any other device information that could be used to indicate device sensitivity or fidelity. In this example, the device profile information is stored in registration information database 335. Alternatively or additionally, an external system or database (not shown) may be accessed to obtain the device profile information for some or all of the wireless communication devices.

The device profile is then processed to identify a receive sensitivity (406). The receive sensitivity may be a quantifiable measure or estimate of the sensitivity or fidelity of the wireless communication device. In one example, control system 330 may make a determination of the receive sensitivity based on the device profile information. In other examples, the receive sensitivity may be pre-determined based on the profile information. Control system 330 may keep track of the wireless communication devices that have registered with base stations 310 and 310 and the associated receive sensitivities. This information may, for example, be stored in receive sensitivity database 336.

After being identified, the receive sensitivity is then processed to determine a power level to transmit the pilot signal (408). The power level may be determined in any number of ways. In one example, control system 330 sorts or ranks the wireless communication devices for each sector by receive sensitivity and then optimizes for a percentage of the devices. For instance, control system 330 may sort wireless communication devices 321-329 located in sector 320A by receive sensitivity and then optimize the power level or signal strength of the pilot signal covering sector 320A for eighty percent of the devices. Optimizing the power level or signal strength of the pilot signal in this way means that the power level of the pilot signal is set at a minimum level such that eighty percent of the wireless communication devices in the sector can receive the signal if they are at the edge of the sector. In other examples, control system determines the power level to transmit the pilot signal using an average, mean, and/or medium of the identified receive sensitivities for each sector.

Figure 6:
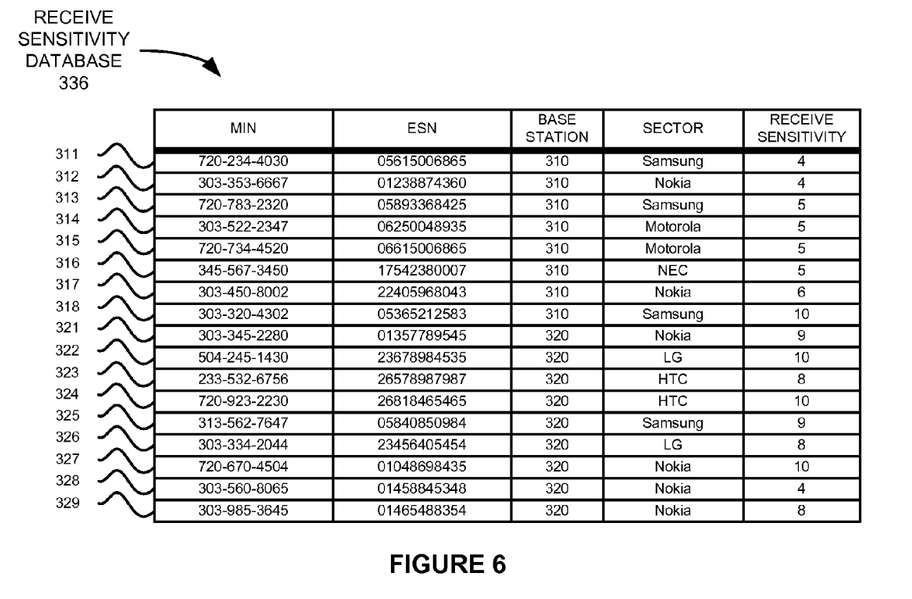
FIG. 6 illustrates contents of a receive sensitivity database.

In an example of operation, control system 330 processes the receive sensitivity of wireless communication devices 311-315 to determine a power level to transmit the pilot signal within sector 310A. In this example, the receive sensitivities of wireless communication devices 311-315 are processed to determine a median receive sensitivity. As shown in FIG. 6, wireless communication devices 311 and 312 have a receive sensitivity of 4, and wireless communication devices 313, 314, and 315 have a receive sensitivity of 5. Control system 330 determines the median receive sensitivity to be 5. Thus, control system 330 determines a power level such that wireless communication devices on the edge of the sector can receive the signal if they have a receive sensitivity of 5 or higher. In this case, the determined power level excludes wireless communication device 311 which sits on the edge of sector 310A and has a receive sensitivity of 4.

In another example of operation, control system 330 processes the receive sensitivity of wireless communication devices 316 and 317 to determine a power level to transmit the pilot signal within sector 310B. In this example, the receive sensitivities of wireless communication devices 316 and 317 are processed to determine an average receive sensitivity. As shown in FIG. 6, wireless communication device 316 has a receive sensitivity of 4 and wireless communication device 317 has a receive sensitivity of 6. Control system 330 determines the average receive sensitivity to be 5. Thus, control system 330 determines a power level such that wireless communication devices on the edge of the sector can receive the signal if they have a receive sensitivity of 5 or higher. In this case, the determined power level excludes wireless communication device 316.

In yet another example of operation, control system 330 processes the receive sensitivity of wireless communication device 318 to determine a power level to transmit the pilot signal within sector 310C. In this example, the receive sensitivity of wireless communication device 318 is processed to determine a receive sensitivity. As shown in FIG. 6, wireless communication devices 318 has a receive sensitivity of 10. Wireless communication device 318 may have a receive sensitivity of 10 because the device includes an advanced diversity antenna. However, in this case wireless communication device 318 is slowly moving out of range.

Those skilled in the art will appreciate that with the advancement of technology, wireless communication devices have also advanced significantly. For example, advanced wireless communication devices may now include diversity antennas capable of decoding signals at less power. However, these advanced wireless communication devices with diversity antennas may not always be able to reach the base station in the reverse direction because wireless communication devices are typically reverse link limited to transmit at a max of 23 decibels (dB). In this case, as wireless communication device 318 moves out of range, wireless communication device 318 is reverse link limited. Thus, control system 330 determines a power level such that wireless communication device 318 is excluded.

In yet another example of operation, control system 330 processes the receive sensitivity of wireless communication devices 321-329 to determine a power level to transmit the pilot signal within sector 320A. As shown in FIG. 6, wireless communication device 321 has a receive sensitivity of 9; wireless communication device 322 has a receive sensitivity of 10; wireless communication device 323 has a receive sensitivity of 8; wireless communication device 324 has a receive sensitivity of 10; wireless communication device 325 has a receive sensitivity of 9; wireless communication device 326 has a receive sensitivity of 8; wireless communication device 327 has a receive sensitivity of 10; wireless communication device 328 has a receive sensitivity of 4; and wireless communication device 329 has a receive sensitivity of 8. Thus, in this case, control system 330 determines that an abundance of advanced devices (e.g., those devices with a receive sensitivity of 8 or more) are present, and thus lowers the power level accordingly. The determined power level will likely exclude wireless communication device 328. However, because sector 320A contains so many wireless communication devices, sector 320A may be congested. In this case, the determined power level could likely exclude other advanced devices (e.g., wireless communication device 329), as well.

In yet another example of operation, control system 330 determines that no wireless communication devices are present in sector 320B. In this case, control system 330 may increase the power level or signal strength of the pilot. For example, control system 330 may increase the power level of the pilot signal such that wireless communication device 318 can receive it. Alternatively, control system 330 may leave the power level of the pilot signal unchanged.

Those skilled in the art will appreciate that the pilot power level or signal strength of the pilot may be determined using other statistical and/or mathematical processes and is not limited to the examples contained herein.

A determination about whether to update the pilot signal power is then made (410). For example, the signal strength of the pilot signal may be initially set to a specified value by the cellular provider to maximize the effective network coverage of the base stations. Over time, the signal strength of the pilot signal may be reduced. In one example, the signal strength of the pilot signal may be periodically reset to the specified value to maximize the effective network coverage. In another example, the signal strength of the pilot signal may be reset to the specified value to maximize the effective network coverage if the number of devices in a sector fails below a given threshold. Alternatively or additionally, control system 330 may only allow the power level or signal strength of the pilot signal to be decreased or modified if the number of devices in a sector exceeds a threshold.

In yet another example, control system 330 may keep track of those wireless communication devices that registered within a given sector within a specified time frame. For example, control system 330 may track active and inactive wireless communication devices can be used in the power level determination. In this case, active wireless communication devices are those devices that are currently in communication with the base station and inactive wireless communication devices are those devices that were in communication with the base station until the pilot signal strength was lowered or those wireless communication devices that have moved out of range.

Those skilled in the art will appreciate that variations and combinations of the above mentioned techniques used to determine whether to update the power level or signal strength of the pilot signal are possible. If control system 330 determines that the signal strength should not be updated, then control system 330 returns to an idle START state to wait for new and or additional registration information. However, if control system 330 determines that the signal strength should be updated, then control system 330 can communicate this information to the base stations.

Once the power level is determined, an instruction is transferred to the base station indicating the power level for the pilot signal (412). For example, upon determining the power level or signal strength for transmitting the pilot signal, control system 330 generates and transmits an instruction to base stations 310 and 320. In this example, the instruction indicates the adjusted power level for transmitting the pilot signal(s). Lastly, the base station transmits the pilot signal at the indicated power level (414). For example, base station 310 may transmit a first pilot signal at a first indicated power level to wireless communication devices in sector 310A, a second pilot signal at a second indicated power level to wireless communication devices in sector 310B, and a third pilot signal at a third indicated power level to wireless communication devices in sector 310C. Likewise, base station 320 may transmit a first pilot signal at a first indicated power level to wireless communication devices in sector 320A, and a second pilot signal at a second indicated power level to wireless communication devices in sector 320B.

Figure 5:
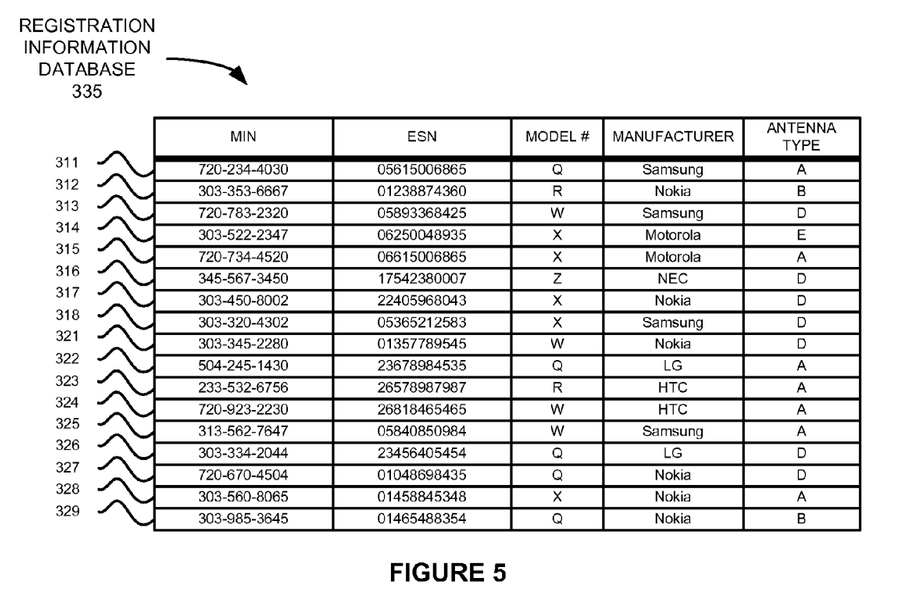
FIG. 5 illustrates contents of a registration information database.

FIG. 5 illustrates contents of a registration information database 335 according to an embodiment. Registration information database 335 comprises an exemplary data structure that shows registration information for a plurality of wireless communication devices. Typically, the registration information is populated by the wireless communication provider when a user operating the wireless communication device signs up for a service provided by the wireless communication provider. Alternatively or additionally, registration information contained within registration information database 335 may be determined based on the registration information received from wireless communication devices as they register with base stations. In some examples, the contents of registration information database 335 could be stored within control systems 130 and 330 and/or other network elements.

As shown, FIG. 5 comprises a first column labeled MIN and remaining columns from left to right labeled ESN, MODEL #, MANUFACTURER, and ANTENNA TYPE. Those skilled in the art will appreciate that registration information database 335 may include other types of registration and/or device information in addition to or in lieu of the columns shown. Each Row represents a wireless communication device.

In this example, wireless communication devices 311-318 and 321-329 are shown. In operation, when control system 330 receives registration information for a wireless communication device, associated registration information may be determined. For instance, registration information for a wireless communication device may include a MIN and/or ESN. Control system 330 may search for the MIN and/or ESN in the registration information database to determine a MODEL #, a MANUFACTURER, and/or an ANTENNA TYPE that is associated with the wireless communication device. Alternatively or additionally, control system may simply query the registration information database for the desired registration information.

FIG. 6 illustrates contents of a receive sensitivity database 336 according to an embodiment. Receive sensitivity database 336 comprises an exemplary data structure that shows receive sensitivity information for a plurality of wireless communication devices. Typically, the receive sensitivity database 336 is populated by control system 330 when wireless communication devices register with base stations and registration information is provided to control system 330. Alternatively or additionally, some or all of the receive sensitivities may be provided to control system 330 via other sources, including but not limited to the wireless service provider. In some examples, the contents of receive sensitivity database 336 can be stored within control systems 130 and 330 and/or other network elements. Likewise, in some examples, the contents of receive sensitivity database 336 can be co-mingled with the contents of registration information database 335.

As shown, FIG. 6 comprises a first column labeled MIN and remaining columns from left to right labeled ESN, BASE STATION, SECTOR, and RECEIVE SENSITIVITY. Those skilled in the art will appreciate that other columns may be included. The receive sensitivity is a measure of the device fidelity. The receive sensitivity is identified or determined based on a number of factors. For example, registration information from registration information database 335 may be used to identify or determine the receive sensitivity. As shown, the receive sensitivity is quantified to a value between 0 and 10. In this case, a value of 0 indicates extremely poor device fidelity and a value of 10 indicates excellent device fidelity. Those skilled in the art will appreciate that any quantifiable measure of device fidelity is possible.

In this example, wireless communication devices 311-318 and 321-329 are shown. In operation, when control system 330 receives registration information for a wireless communication device, control system 330 may determine associated registration information and use this information to determine the fidelity of the wireless communication device. BASE STATION and SECTOR information is provided so that control system 330 can determine the distribution of devices for each sector.

The distribution of device and their associated receive sensitivities are use to determine an appropriate dynamic signal strength at which to transmit pilot signal within each sector. As discussed, control system 330 may sort, rank, or perform other mathematical operations on the receive sensitivities for the wireless communication devices within each sector to determine the appropriate power for that sector.

Figure 7:
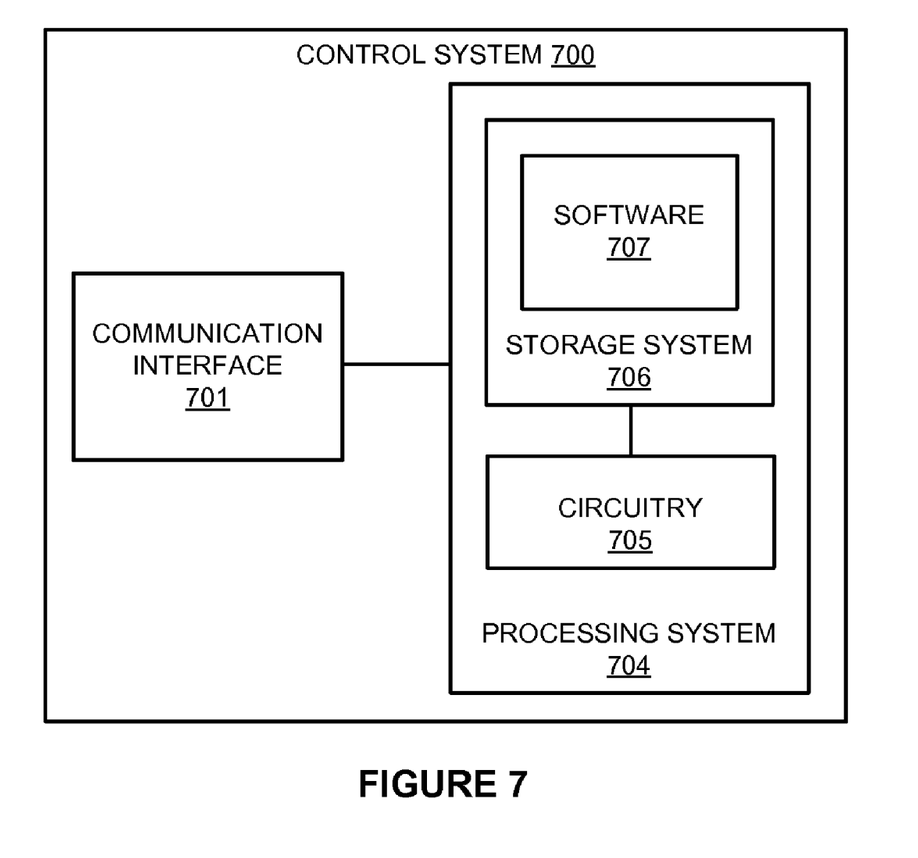
FIG. 7 is a block diagram that illustrates a control system.

FIG. 7 is a block diagram that illustrates control system 700 according to an embodiment. Control system 700 provides an example of control systems 130 and 330, although control systems 130 and 330 may use alternative configurations. Control system 700 comprises communication interface 701, database access interface 702, and processing system 704. Processing system 704 is linked to communication interface 701.

Communication interface 701 comprises components that communicate over communication links, such as network cards, ports, RF transceivers, processing circuitry and software, or some other communication components. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof. Communication interface 701 could be configured to receive registration information transmitted from wireless communication devices and transfer an instruction indicating a signal strength for transmitting the pilot signal for delivery to a base station.

Processing system 704 includes circuitry 705 and storage system 706 that stores operating software 707. Circuitry 705 comprises microprocessor and other circuitry that retrieves and executes operating software 707 from storage system 706. Storage system 706 comprises a disk drive, flash drive, data storage circuitry, or some other memory apparatus. In some examples, storage system 706 may be configured to store data indicating wireless communication device registration information and wireless communication device receive sensitivity. Operating software 707 comprises computer programs, firmware, or some other form of machine-readable processing instructions. Operating software 707 may include an operating system, utilities, drivers, network interfaces, applications, or some other type of software.

When executed by processing circuitry 705, operating software 707 directs processing system 704 to operate as described herein for control systems 130 and 330. In particular, operating software 707 directs processing system 704 to receive registration information transmitted from a plurality of wireless communication devices, processing the registration information to determine device type information for the wireless communication devices, process the device type information to determine a power level to transmit the pilot signal, and transfer an instruction indicating the power level for the pilot signal for delivery to a base station.

Figure 8:
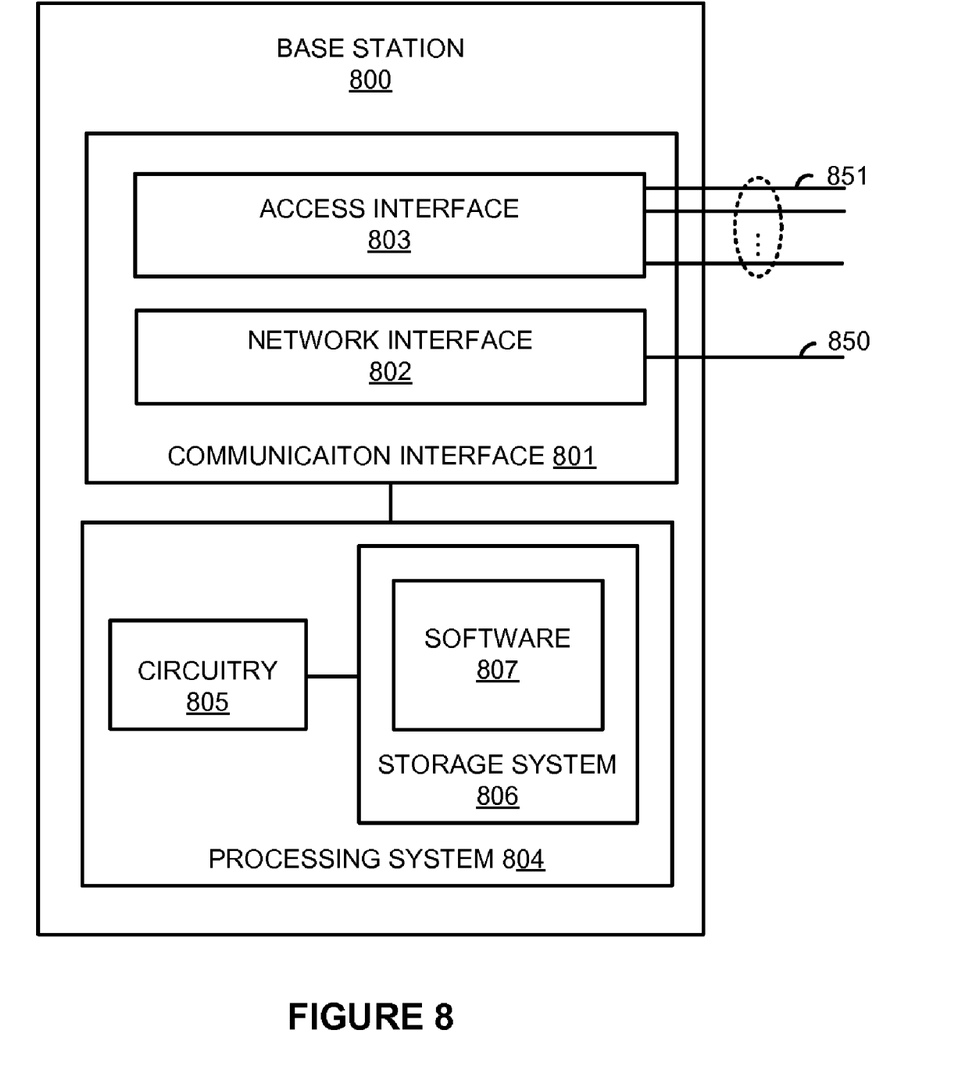
FIG. 8 is a block diagram that illustrates a base station.

FIG. 8 is a block diagram that illustrates base station 800 according to an embodiment. Base station 800 provides an example of base stations 110, 310, and 320, although base stations 110, 310, and 320 may use alternative configurations.

Base station 800 comprises communication interface 701, database access interface 702, and processing system 704. Processing system 704 is linked to communication interface 701.

Communication interface 701 comprises network interface 802 and access interface 803. Network interface 802 comprises network router and gateway equipment for communicating with access and communication networks of a wireless communication provider, such as with control systems 130 and 330. Network interface 802 exchanges user communications and overhead communications with a communication network of a wireless communication system to provide communication services, omitted for clarity, over link 850. Link 850 could use various protocols or communication formats as described herein for links 106 or 333, including combinations, variations, or improvements thereof.

Access interfaces 803 comprise communication interfaces for communicating with wireless communication devices. Access interfaces 803 could include transceiver equipment and antenna elements for exchanging user communications and overhead communications with wireless communication devices in a mobile communication system, omitted for clarity, over links 1151. In some examples, two or more of links 1151 are used to communicate with a single mobile communication device using different spreading codes. Access interfaces 803 also receives command and control information and instructions from processing system 804 for controlling transmission power of the transceiver equipment and the operations of wireless communication devices over the links, as well as for coordinating handoffs of mobile communication devices between other wireless access nodes or base stations. Links 1151 could each use various protocols or communication formats as described herein for wireless links 101-102 and 331-332, including combinations, variations, or improvements thereof.

Processing system 804 includes circuitry 805 and storage system 806 that stores operating software 807. Circuitry 805 comprises microprocessor and other circuitry that retrieves and executes operating software 807 from storage system 806. Storage system 806 comprises a disk drive, flash drive, data storage circuitry, or some other memory apparatus. Operating software 807 comprises computer programs, firmware, or some other form of machine-readable processing instructions. Operating software 807 may include an operating system, utilities, drivers, network interfaces, applications, or some other type of software.

When executed by processing circuitry 805, operating software 807 directs processing system 804 to operate as described herein for base stations 110, 310, and 320. In particular, operating software 807 directs processing system 804 to receive registration information transmitted from a plurality of wireless communication devices, transfer the registration information a control system, receive an instruction indicating the power level for the pilot signal, and transmit the pilot signal at the indicated power level.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system to control a pilot signal, the method comprising:

receiving a device identity transmitted from a plurality of wireless communication devices;

in response to receiving the device identity, processing at least the device identity to determine device type information comprising at least one of a model number and an antenna type for the wireless communication devices;

processing at least the device type information to determine a power level to transmit the pilot signal;

transferring an instruction indicating the power level for the pilot signal for delivery to a base station;

transmitting the pilot signal from the base station at the indicated power level.

2. The method of claim 1 wherein the device identity comprises an electronic serial number (ESN).

3. The method of claim 1 wherein the device identity comprises a mobile identification number (MIN).

4. The method of claim 1 wherein the device type information corresponds to a receive sensitivity, and wherein the receive sensitivity indicates a fidelity level for the wireless communication devices.

5. The method of claim 4 wherein processing the device type information to determine the power level comprises determining the receive sensitivity and selecting the power level based on the receive sensitivity.

6. The method of claim 5 wherein the power level is selected based on a receive sensitivity corresponding to a subset of the wireless communication devices.

7. The method of claim 5 wherein the power level is selected based on a receive sensitivity corresponding to a percentage of the wireless communication devices.

8. The method of claim 5 wherein the power level is selected based on a total number of devices of the plurality of wireless communication devices.

9. A wireless communication system to control a pilot signal, the system comprising:

a control system configured to receive a device identity transmitted from a plurality of wireless communication devices, process at least the device identity in response to receiving the device identity to determine device type information comprising at least one of a model number and an antenna type for the wireless communication devices, process at least the device type information to determine a power level to transmit the pilot signal, and transfer an instruction indicating the power level for the pilot signal for delivery to a base station; and a base station configured to receive the instruction indicating the power level for the pilot signal and to transmit the pilot signal at the indicated power level.

10. The wireless communication system of claim 9 wherein the device identity comprises an electronic serial number (ESN).

11. The wireless communication system of claim 9 wherein the device identity comprises a mobile identification number (MIN).

12. The wireless communication system of claim 9 wherein the device type information corresponds to a receive sensitivity, and wherein the receive sensitivity indicates a fidelity level for the wireless communication devices.

13. The wireless communication system of claim 12 wherein to process the device type information to determine the power level, the control system is further configured to determine the receive sensitivity and select the power level based on the receive sensitivity.

14. The wireless communication system of claim 12 wherein the control system is configured to select the power level based on a receive sensitivity corresponding to a subset of the wireless communication devices.

15. The wireless communication system of claim 12 wherein the control system is configured to select the power level based on a receive sensitivity corresponding to a percentage of the wireless communication devices.

16. The wireless communication system of claim 12 wherein the control system is configured to select the power level based on a total number of devices of the plurality of wireless communication devices.

* * * * *